(12) United States Patent
Suzuki et al.

(10) Patent No.: US 6,808,832 B2
(45) Date of Patent: Oct. 26, 2004

(54) FUEL CELL HUMIDIFYING SYSTEM

(75) Inventors: Motohiro Suzuki, Wako (JP);
Toshikatsu Katagiri, Wako (JP);
Hiroshi Shimanuki, Wako (JP); Yoshio Kusano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 182 days.

(21) Appl. No.: 09/774,374

(22) Filed: Jan. 30, 2001

(65) Prior Publication Data

US 2001/0010872 A1 Aug. 2, 2001

(30) Foreign Application Priority Data

Jan. 31, 2000 (JP) ........................................ 2000-023226

(51) Int. Cl.⁷ ................................................ H01M 8/02
(52) U.S. Cl. ............................. 429/13; 429/22; 429/24; 429/26
(58) Field of Search ......................... 429/13, 12, 22, 429/24, 26, 34, 20, 19; 261/104, 107, 142, 154

(56) References Cited

U.S. PATENT DOCUMENTS 3,607,423 A * 9/1971 Bertioli ....................... 429/17
5,668,535 A * 9/1997 Hendrix et al. .............. 340/607
6,103,409 A * 8/2000 DiPierno Bosco et al. ... 429/13
6,106,964 A * 8/2000 Voss et al. .................... 429/20

FOREIGN PATENT DOCUMENTS

JP          8273687     * 10/1996     ............ H01M/8/04

* cited by examiner

Primary Examiner—Randy Gulakowski
Assistant Examiner—Monique Wills
(74) Attorney, Agent, or Firm—Lahive & Cockfield, LLP; Anthony A. Laurentano, Esq.

(57) ABSTRACT

The fuel cell humidifying system is to prevent freezing and clogging of a water permeable type humidifier by providing a gas passage switching device for changing the gas flow paths communicating with the humidifier. To direct the flow of dry air exiting from the supercharger to the exhaust passage in the humidifier, the gas passage switching device includes a first three-way valve, a second three-way valve, a flow adjusting valve and a sweep piping. In this system, water vapor in the humidifier which causes freezing can be swept off by flowing dry air through the exhaust gas passage in the humidifier, and therefore, clogging caused by ice particles which plug up the pores of the hollow thread membrane in the humidifier can be prevented.

4 Claims, 5 Drawing Sheets

FUEL CELL HUMIDIFYING SYSTEM

BACKGROUND OF THE INVENTION

1. Field of the Invention

The present invention relates to a fuel cell humidifying system having a water permeable humidifier, and relates in particular to a technology for preventing freezing of humidifier and resulting clogging of the fuel cell.

2. Description of the Related Art

A fuel cell that uses a solid polymer membrane for the electrolyte membrane, for example, is comprised by stacking a plurality of unit cells.

A unit cell is comprised by a core of a solid polymer membrane of ionic conductivity in intimate contact with a fuel-electrode (anode) and an air-electrode (cathode) on each surfaces thereof. When hydrogen gas is supplied through the fuel gas passage formed as an U-shaped groove on the surface facing the fuel-electrode and air is supplied simultaneously through the oxidizer passage formed as an U-shaped groove on the surface facing the air-electrode, electricity is generated as a result of electrochemical reaction between the electrodes in each unit cell.

To maintain high electrical generation efficiency, the solid polymer membrane must be maintained in a water-saturated state so as to enable the solid polymer to function as a proton (hydrogen ions) conductive electrolyte.

However, during the electricity generation process, the solid polymer membrane is sometimes subjected to conditions that promote drying, due to various factors including the fact that the water generated by chemical reaction is transported out of the system. Therefore, to maintain good ionic conductivity, it is necessary to supply moisture to the solid polymer membrane.

For this reason, a conventional approach is to devise a humidifying system to humidify dry gases such as the air to be supplied to the air-electrode side and the hydrogen to be supplied to the fuel-electrode side by passing both gases through a water permeable humidifier so as to obtain wet gases for humidifying the solid polymer membrane.

Here, the term "dry gas(es)" means the gas has a relative low humidity, such as the gas contains little moisture or contains moisture insufficient to humidify the solid polymer membrane, and the term "wet gas(es)" means the gas has a relative high humidity, such as the gas contains moisture sufficient to humidify the solid polymer membrane.

This type of humidifier is provided with a hollow threaded membrane to permit water to infiltrate in the direction of the film thickness (refer to Japanese Patent Application, First Publication, No. Hei 7-71795, and Japanese Patent Application, First Publication, No. Hei 8-273687), and for example, humidification of the air-electrode side is carried out as follows.

That is, while dry air is being forced through a jacket containing a packing comprised by an assembly of hollow thread membranes using a charging apparatus such as a supercharger, wet out-gas discharged from the air-electrode side is forced through the hollow section inside the hollow thread membrane so that the moisture contained in the wet out-gas can infiltrate through the porous surface of the hollow thread membrane and disperse on the outside of the hollow thread membrane as water vapor to add humidity to the dry air flowing through the inter-thread spaces formed by the thread membranes.

However, in the fuel cell humidifying system provided with a water permeable humidifier, water is produced by the redox reaction of oxygen and hydrogen, and the produced water is recovered from the wet out-gas and transferred to the dry gas through the hollow thread membrane in the humidifier, and is reused to add humidity to the fuel cell. Therefore, during the cold spell or in cold climate, it is unavoidable to subject the moisture in the humidifier to freezing conditions.

Freezing creates problems in the following manner. Because the pore diameter of the hollow thread membrane is extremely fine (4 nm) and can exert a very high surface tension force, the moisture condensed in the pores is subjected to supercooling and does not undergo phase transformation (water to ice) but, because the internal diameter of the hollow section of the hollow thread membrane is relatively large (0.37 mm) and is not subjected to supercooling, the moisture becomes frozen.

When the moisture becomes frozen in the interior of the hollow thread membrane, it becomes difficult to operate the system at its optimal capacity.

Also, it is also possible that, if dust particles and the like having diameters larger than the inside diameters of the hollow section or the pores of the membrane are mixed in the wet out-gas from the fuel cell, such particles may block the entrance to the hollow section or plug up the pores of the membrane to cause a pressure increase at the entrance to the hollow thread membrane or decrease in the recoverable amount (percent) of water, resulting in degradation in the performance of the inherent capability of the fuel cell humidifying system.

Similarly, for the dry gas supplied by the supercharger and the like through the gas passage may also be subjected to detrimental effects of freezing and clogging.

Accordingly, when freezing or clogging is generated in the hollow thread membrane of the humidifier, it becomes difficult to operate the fuel cell at its inherent optimal capability by continuing to recover a sufficient amount of water from the wet out-gas to resupply an appropriate degree of humidity to the fuel cell.

SUMMARY OF THE INVENTION

The present invention is provided in view of the background information described above, and it is an object of the present invention to provide a technology for preventing freezing and clogging in the humidifier.

To resolve the problem described above, the present invention provides the following structure of the fuel cell humidifying system.

That is, the fuel cell humidifying system of the present invention is for providing a dry gas (in the embodied case, dry air Ad) and an exhaust gas (in the embodied case, wet out-air OAw) discharged from the fuel cell (1) into a water permeable type humidifier (3) so as to recover moisture contained in the exhaust gas in the dry gas to produce a wet gas (in the embodied case, wet air Aw) which is supplied to the fuel cell; and the system has a flow path switching mechanism (in the first embodiment, this mechanism comprises a first three-way valve 4, a second three-way valve 5, a flow adjusting valve 6, sweep piping 9, and a control apparatus; and in the second embodiment, this mechanism comprises first reverse cleansing piping 31, second reverse cleansing piping 32, first exhaust piping 33, second exhaust piping 34, a pressure sensor 35, a first shutoff valve 41, a second shutoff valve 42, a third shutoff valve 43, a fourth shutoff valve 44, a fifth shutoff valve 45, a sixth shutoff valve 46, a seventh shutoff valve 47, and a control apparatus) for switching gas passages (in the embodied case, air piping 7, out-air piping 8) leading to the humidifier.

According to the fuel cell humidifying system, clogging in the humidifier can be prevented by switching the flow direction in the humidifier.

In this case, the flow path switching mechanism may adopt a mechanism for flowing a dry gas in the exhaust gas passage in the humidifier (in the embodied case, the wet out-air passage) or a mechanism for reversing the flow direction of exhaust gas in the humidifier.

In the former flow path switching mechanism, by flowing the dry gas in the exhaust gas passage in the humidifier before the moisture freezes, water vapor that causes freezing can be swept out so that freezing can be prevented beforehand.

In the latter flow path switching mechanism, even if clogging are generated in the exhaust gas passage in the humidifier by dust particles and other such substances contained in the exhaust gas flowing in the forward direction, because the exhaust gas flow direction can be reversed, such clogging can be eliminated by reverse flow cleansing.

DESCRIPTION OF THE PREFERRED EMBODIMENTS

A first embodiment will be presented in the following with reference to the drawings. The structural features of the fuel cell and the hollow thread membrane serving the function of a water permeable membrane in the present invention are the same as those described in the Description of the Related Art, and therefore, their explanations are omitted.

First Embodiment

Figure 1:
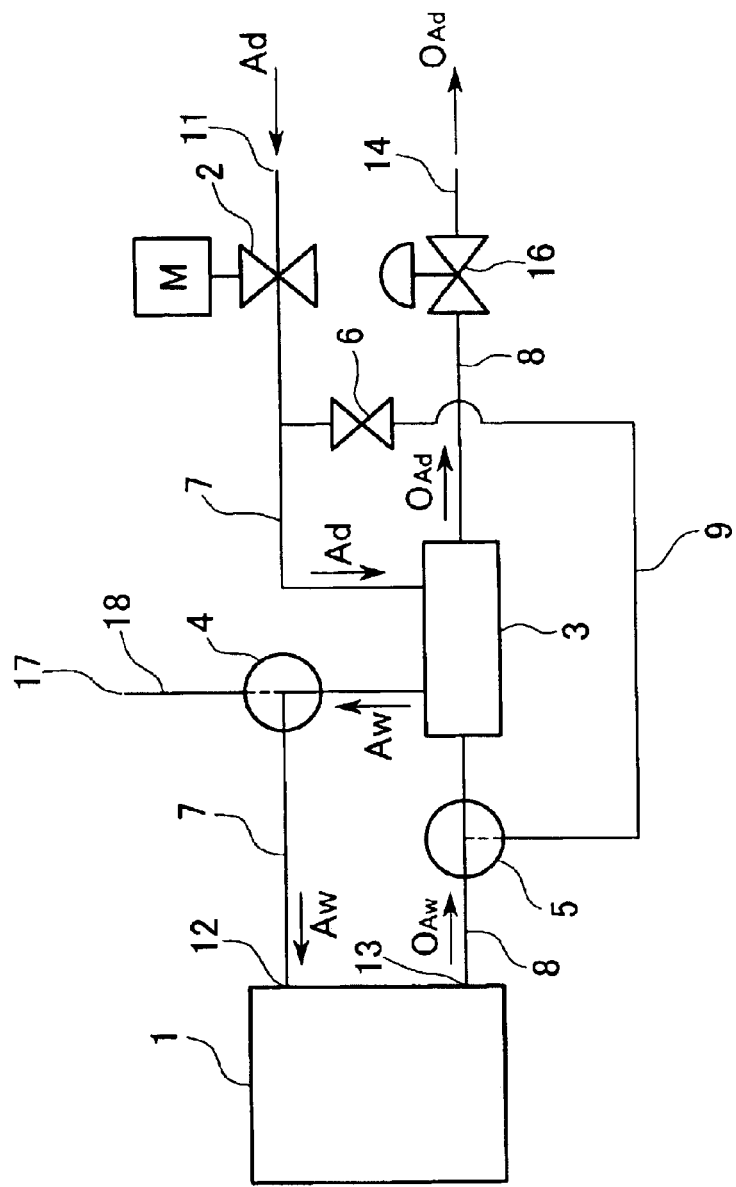
FIG. 1 is a schematic diagram of the gas flow during the normal mode of operation in the fuel cell humidifying system in a first embodiment.
Figure 2:
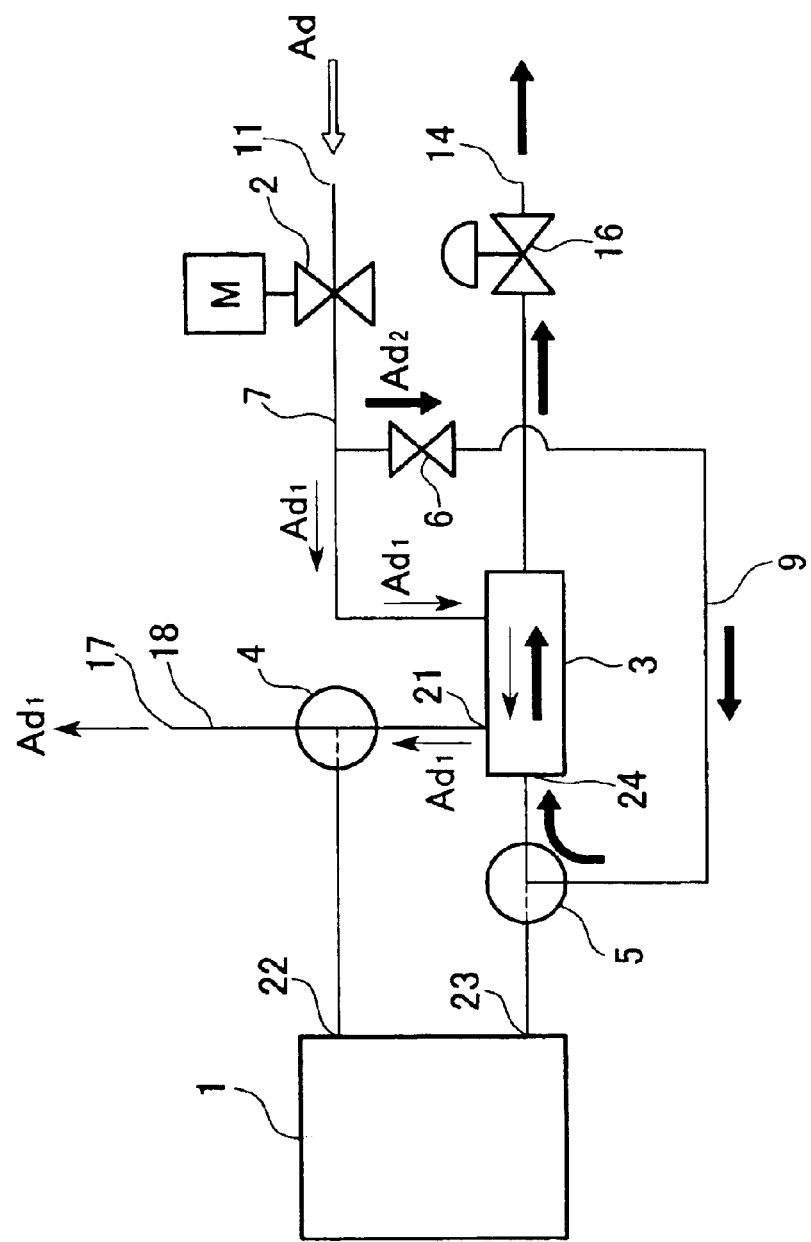
FIG. 2 is a schematic diagram of the gas flow during the gas sweeping mode of operation in the fuel cell humidifying system in the first embodiment.

FIG. 1 shows a schematic diagram of the configuration of a fuel cell humidifying system in the first embodiment in the normal mode of operation, and FIG. 2 shows the same in the gas sweeping mode of operation.

In these diagrams, the reference numeral 1 relates to a solid polymer electrolyte type fuel cell (fuel cell hereinbelow); 2 to a supercharger; 3 to a humidifier; 4 to a first three-way valve; 5 to a second three-way valve; 6 to a flow adjusting valve; 7 to an air piping; 8 to an out-air piping; and 9 to a sweep piping, and the system components including the above are controlled by a control apparatus which is not shown.

First, with reference to FIG. 1, the overall system configuration of the present fuel cell humidifying system and the operation of the system in the normal mode will be explained.

The air-electrode (cathode) of the fuel cell 1 is connected to the air piping 7 for supplying outside air (referred to as dry air Ad) which is inhaled from an intake opening 11 and serving as the oxidizer, to an oxidizer inlet opening 12; and the out-air piping 8 for discharging the out-gas (referred to as wet out-air OAw hereinbelow) which flows from the oxidizer outlet opening 13, to an exhaust opening 14.

The supercharger 2, the humidifier 3, the first three-way valve 4 are provided in the air piping 7 from the upstream side to the downstream side of flowing dry air Ad (that is, from the intake opening 11 to the fuel cell 1) in the stated order.

The second three-way valve 5, the humidifier 3, and the pressure adjusting valve 16 are provided in the out-air piping 8 from the upstream side to the downstream side of flowing wet out-air OAw (that is, from the fuel cell 1 to the exhaust opening 14) in the stated order.

The sweep piping 9 branches off from the air piping 7 between the supercharger 2 and the humidifier 3, and bypasses the humidifier 3, the first three-way valve 4 and the fuel cell 1 and is connected to the second three-way valve 5. Furthermore, the flow adjusting value 6 is provided with the sweep piping 9.

Also, a discharge piping 18 communicating with the exhaust opening 17 is connected to the first three-way valve 4 provided in the air piping 7.

During the normal mode of operation, the flow adjusting valve 6 is fully-closed, and the outside air (dry air Ad) inhaled from the intake opening 11 recovers moisture from the wet out-air OAw discharged from the fuel cell 1 in the humidifier 3, that straddles both air piping 7 and the out-air piping 8, to produce wet air Aw which is supplied to the fuel cell 1.

The wet air Aw is used for electrical generation together with the hydrogen supplied from a high pressure hydrogen tank (not shown) to the fuel cell 1 as well as for supplying moisture to maintain the solid polymer membrane in the fuel cell 1 in the water-saturated state.

On the other hand, the wet out-air OAw, that is used for humidifying the dry air Ad and is dehumidified, becomes dry out-air OAd and is discharged from the exhaust opening 14.

Next, the gas sweeping mode of operation of the fuel cell humidifying system is an example of the system operation, and will be explained with reference to FIG. 2. The gas sweeping mode is carried out while the fuel cell 1 is stopped and when the outer temperature detected by the temperature sensor (not shown) becomes equal to 0° C. or below.

Prior to the gas sweeping mode, the flow adjusting valve 6 is changed from "close" to "open", and the first three-way valve 4 is controlled in such a way that the passage from the wet air outlet 21 of the humidifier 3 to the wet air inlet 22 of the fuel cell 1 is closed while the passage from the wet air outlet 21 to the exhaust opening 17 is opened, and further, the second three-way valve 5 is controlled in such a way that the passage from the wet out-air outlet 23 of the fuel cell 1 to the wet out-air inlet 24 of the humidifier 3 is closed while the passage from the sweep piping 9 to the wet out-air inlet 24 is opened.

When the system is in the condition described above and the motor in the supercharger 2 is turned on, dry air Ad is inhaled from the intake opening 11 into the air piping 7.

The dry air Ad exiting from the supercharger 2 is divided into dry air Ad1 that enters into the humidifier 3 through the air piping 7 without any change, and dry air Ad2 flows into the sweep piping 9 and enters into the humidifier 3 through the second three-way valve 5.

The dry air Ad1 flows through the dry air passage in the humidifier 3 and exits from the humidifier 3, and is discharged from the exhaust opening 17 through the first three-way valve 4 and the discharge piping 18. The dry air Ad2 flows through the wet out-air passage (discharge gas passage) in the humidifier 3 and, after exiting from the humidifier 3, is discharged from the exhaust opening 14 through the pressure adjusting valve 16.

As described above, according to this embodiment of the fuel cell humidifying system, when it is anticipated according to outside temperature that freezing of the humidifier 3 may take place, the dry air Ad exiting from the supercharger 2 is directed, before freezing takes place, to the dry air passage and wet out-air passage inside the humidifier 3, and therefore, residual moisture which causes freezing is swept from the dry air passage and wet out-air passage to prevent the humidifier 3 from freezing.

Second Embodiment

Figure 3:
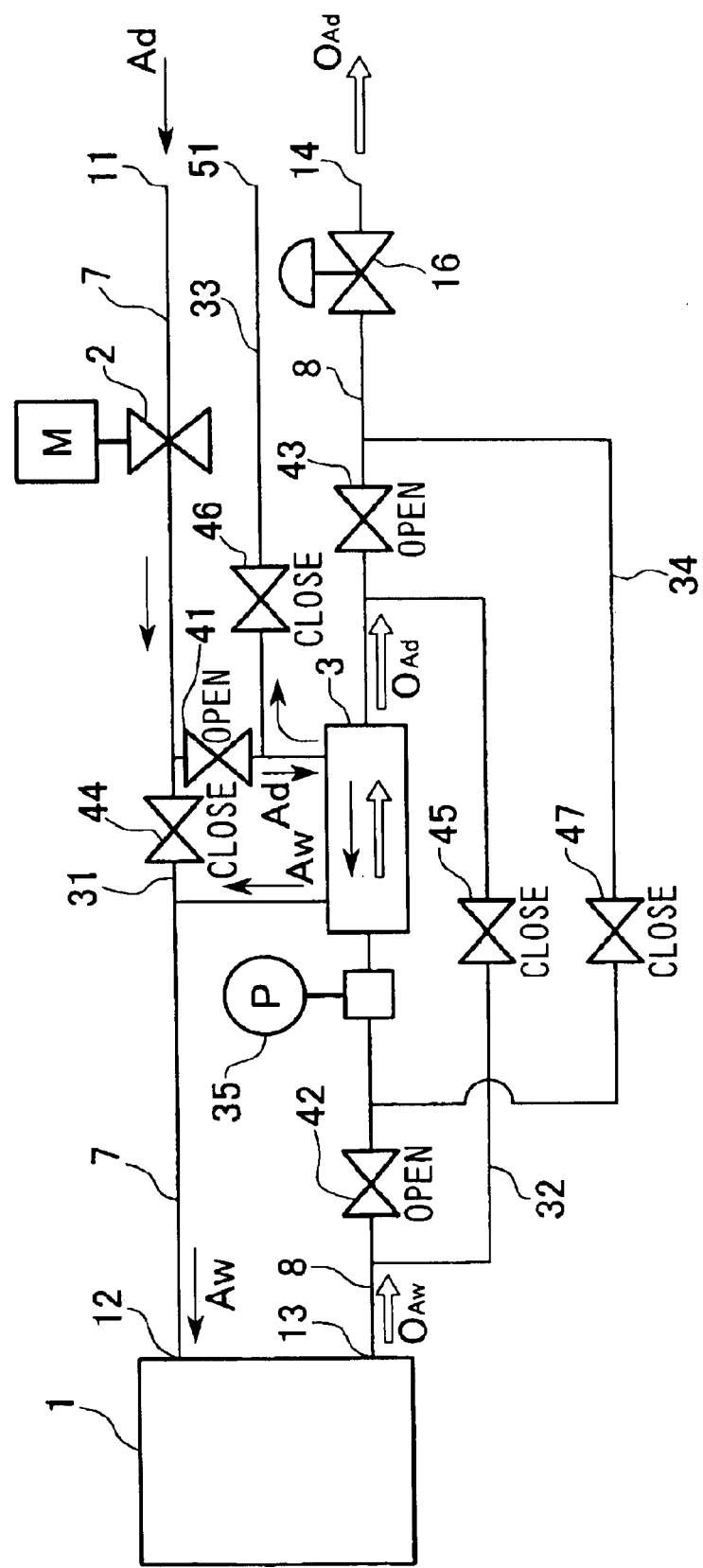
FIG. 3 is a schematic diagram of the gas flow during the normal mode of operation in the fuel cell humidifying system in a second embodiment.
Figure 4:
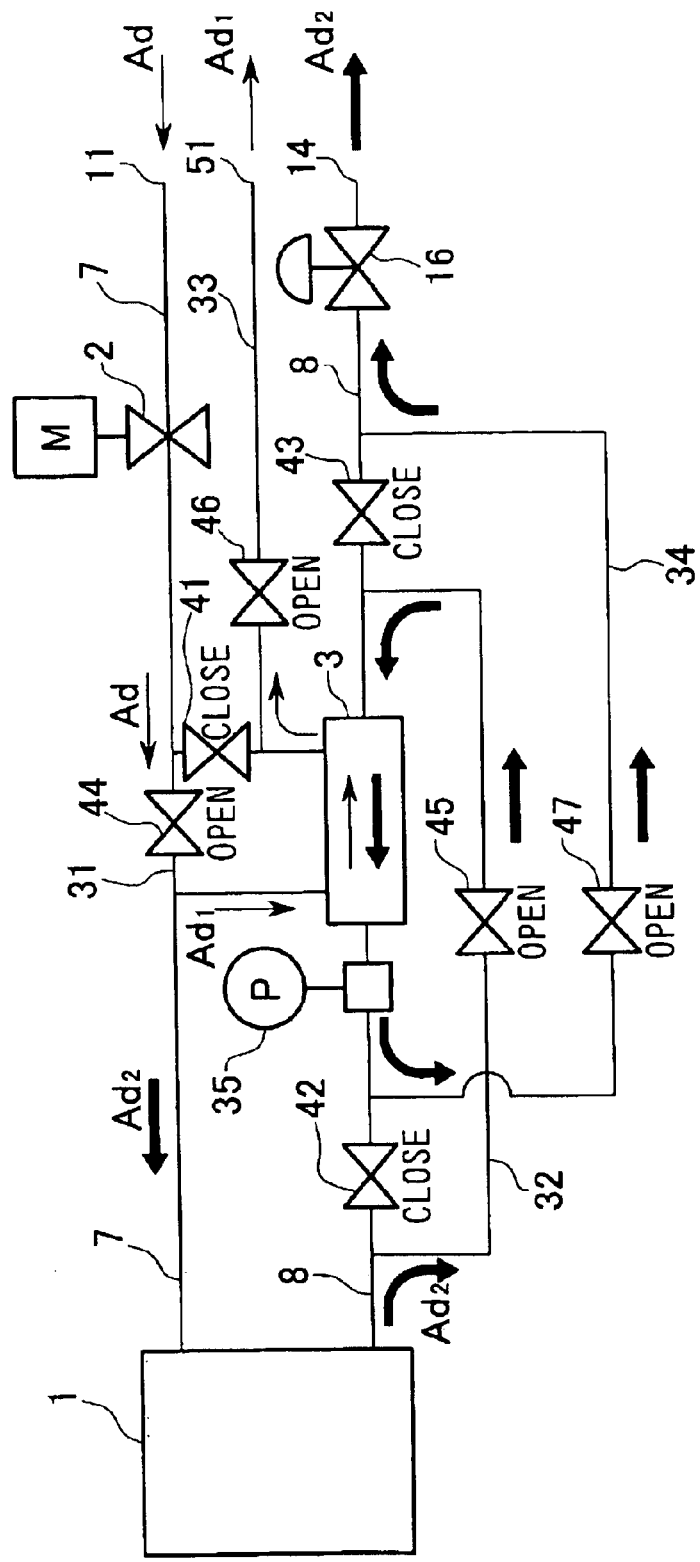
FIG. 4 is a schematic diagram of the gas flow during the reverse flow cleansing mode of operation in the fuel cell humidifying system in the second embodiment.

FIG. 3 shows a schematic diagram of the flow of gas in the normal mode of operation of the fuel cell humidifying system in the second embodiment, and FIG. 4 shows a configuration of the system operating in the reverse flow cleansing mode.

In the diagrams, a reference numeral 31 relates to a first reverse cleansing piping, 32 to a second reverse cleansing piping, 33 to a first exhaust piping, 34 to a second exhaust piping and 35 to a pressure sensor. The parts that are the same as those in FIGS. 1 and 2 are given the same reference numbers.

The overall system configuration and the normal mode of operation of the fuel cell humidifying system will be explained with reference to FIG. 3.

The air-electrode of the fuel cell 1 is connected to an air piping 7 for supplying outside air (dry air Ad) which is inhaled from an intake opening 11 and serving as the oxidizer, to an oxidizer inlet opening 12; and an out-air piping 8 for discharging the out-gas (wet out-air OAw) which is discharged from the oxidizer outlet opening 13, to the exhaust opening 14.

In the air piping 7 from upstream side to downstream side of the flow of dry air Ad (that is, from the intake opening 11 to the fuel cell 1), there are provided a supercharger 2, a first shutoff valve 41 and a humidifier 3 in the stated order.

In the out-air piping 8 from upstream side to downstream side of the flow of wet out-air OAw (that is, from the fuel cell 1 to the exhaust opening 14), there are provided a second shutoff valve 42, a pressure sensor 35, a humidifier 3 and a third shutoff valve 43 and a pressure adjusting valve 16 in the stated order.

The first reverse cleansing piping 31 is installed in such a way that one end is connected between the supercharger 2 and the first shutoff valve 41 so as to bypass the first shutoff valve 41 and the humidifier 3 in the air piping 7, and other end is connected between the humidifier 3 and the fuel cell 1, and a fourth shutoff valve 44 is provided with the first reverse cleansing piping 31.

The second reverse cleansing piping 32 is installed in such a way that one end is connected between the fuel cell 1 and the second shutoff valve 42 so as to bypass the second shutoff valve 42, the pressure sensor 35 and the humidifier 3 in the out-air piping 8, and other end is connected between the humidifier 3 and the third shutoff valve 43, and a fifth shutoff valve 45 is provided with the second reverse cleansing piping 32.

The first exhaust piping 33 is installed in such a way that one end is connected between the humidifier 3 and the first shutoff valve 41 in the air piping 7, and other end is connected to an exhaust opening 51, and a sixth shutoff valve 46 is provided with the first exhaust piping 33.

The second exhaust piping 34 is installed in such a way that one end is connected between the second shutoff valve 42 and the pressure sensor 35 so as to bypass the pressure sensor 35, the humidifier 3 and the third shutoff valve 43 in the out-air piping 8, and other end is connected between the third shutoff valve 43 and the pressure adjusting valve 16, and a seventh shutoff valve 47 is provided with the second exhaust piping 34.

During the normal mode of operation, the first, second and third shutoff valves 41, 42, 43, respectively, are opened, and the fourth, fifth, sixth and seventh shutoff valves 44, 45, 46, 47, respectively, are closed. The outside air (dry air Ad) inhaled from the intake opening 11 by the supercharger 2 recovers moisture from the wet out-air OAw discharged from the fuel cell 1 in the humidifier 3 which straddles both air piping 7 and the out-air piping 8, to produce wet air Aw which is supplied to the fuel cell 1.

The wet air Aw is used for electrical generation together with the hydrogen supplied from a high pressure hydrogen tank (not shown) to the fuel cell 1 as well as for supplying moisture to maintain the solid polymer membrane in the fuel cell 1 in the water-saturated state.

The reverse flow cleansing mode of operation of the fuel cell humidifying system as an example of operation of the system will be explained with reference to FIG. 4.

The reverse flow cleansing mode of operation is carried out not only while the fuel cell 1 is stopped but also while the vehicle is moving. For example, when the fuel cell 1 is installed in an electric vehicle or a hybrid vehicle, this mode of operation is carried out while the vehicle is stopped or moving, if the pressure detected by the pressure sensor 35 at the inlet of the hollow thread membrane exceeds a preset value for each output pressure setting by 5 kPa.

In the following, the reverse flow cleansing mode of operation when the vehicle is electrically driven by using the power from the battery (not shown) will be explained as an example of the reverse flow cleansing mode of operation.

Prior to reverse flow cleansing, the system is prepared so that the first, second and third shutoff valves 41, 42, 43, respectively, are switched from "open" to "close", and the fourth, fifth, sixth and seventh shutoff valves 44, 45, 46, 47, respectively, are switched from "close" to "open".

From this condition, the dry air Ad inhaled the air piping 7 from the inlet opening 11 by the supercharger 2 flows into the first reverse cleansing piping 31, and after passing through the fourth shutoff valve 44, it is divided into dry air Ad1 to flow towards the humidifier 3 and dry air Ad2 to flow towards the fuel cell 1.

The dry air Ad1 flows into the humidifier 3 and traverses the dry air passage in the reverse direction, and after exiting from the humidifier 3, it is exhausted from the exhaust opening 51 through the sixth shutoff valve 46.

On the other hand, the dry air Ad2 passes through the fuel cell 1 and flows into the second reverse cleansing piping 32 from the out-air piping 8, and after passing through the fifth shutoff valve 45, it returns again to the out-air piping 8 and flows into the humidifier 3.

After this stage, the dry air Ad2 flows in the reverse direction through the wet out-air passage in the humidifier 3, and after exiting the humidifier 3, it passes through the pressure sensor 35 and flows into the second exhaust piping 34, and further, after passing through the seventh shutoff valve 47, it returns again to the out-air piping 8 and exhausted from the exhaust opening 14 through the pressure adjusting valve 16.

As described above, according to this embodiment of the fuel cell humidifying system, while the vehicle is driven, the dry air Ad from the supercharger 2 is made to flow in the reverse direction in the dry air passage and the most out-air passage inside the humidifier 3 when the inlet pressure of the hollow thread membrane detected by the pressure sensor 35 exceeds a predetermined value, and therefore, it is possible to resolve the problem of clogging in the hollow thread membrane using the reverse flow cleansing.

Furthermore, the system is for cleansing the humidifier 3 by switching the flow direction of the air in the humidifier 3. That is, the system functions as a cleansing mechanism for preventing clogging in the humidifier 3.

It is noted that although the dry air Ad1 is made to flow in reverse not only in the wet out-air passage but also in the dry air passage in the humidifier 3, as far as the dry air passage is concerned, it is permissible to let the dry air Ad1 flow in the same direction as the direction of flow during the normal mode of operation. The reason is that, compared with the wet out-air OAw discharged from the fuel cell 1, the dry air Ad1 exiting from the supercharger 2 is filtered in the upstream side to remove dust particles and the like, resulting in relatively cleaner air so that it is unlikely to cause clogging so that there is less need for cleansing the dry air passage.

Another cleansing mechanism which is suitable for cleansing the humidifier 3 can be also provided in addition to the above-described system which performs reverse flow cleansing by switching the flow direction of the air. For example, a cleansing mechanism having a tank which enables to collect gas can be provided in the air piping. In this mechanism, the reverse flow cleansing and is performed in case of need, by opening the tank and releasing the gas into the piping when the switching of the flow direction of the air is performed.

Also, it is obvious that the cleansing mechanisms as disclosed above are effective in resolving clogging caused by freezing in the humidifier 3.

Third Embodiment

It is noted that, to prevent clogging in the dry air passage and the wet out-air passage in the humidifier 3 of the present fuel cell humidifying system having the water permeable type humidifier 3, it is effective to provide filters on each humidifier side of the air piping 7 and the out-air piping 8.

Figure 5:
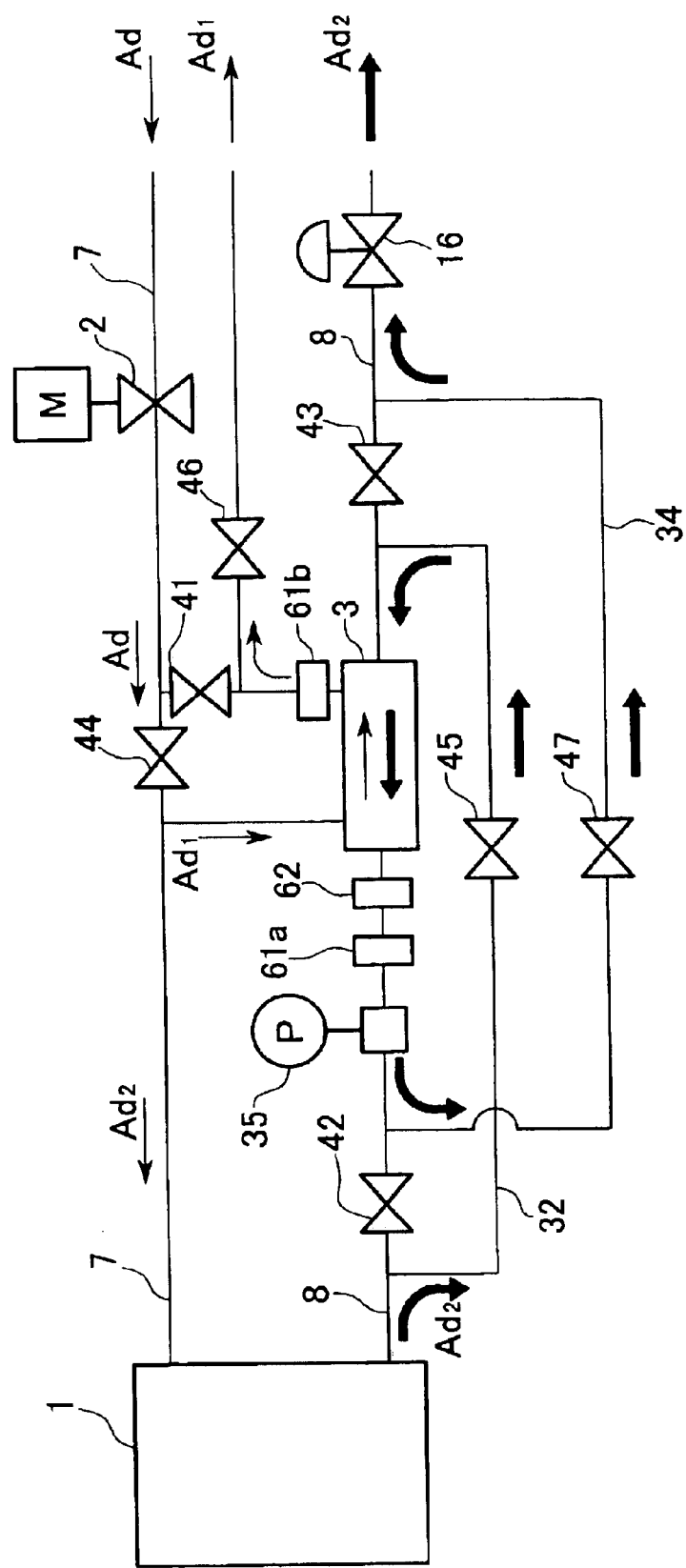
FIG. 5 is a schematic diagram of a third embodiment of the fuel cell humidifying system.

FIG. 5 shows a configuration of a third embodiment fuel cell humidifying system produced by adding the filters to the system described in the second embodiment. In the diagram, the reference numerals 61a, 61b relate to filters, and 62 relates to unreacted matter removal means comprised by an adsorbing agent such as activated charcoal and zeolite or platinum catalyst. Other components are the same as those in the fuel cell humidifying system described in the second embodiment and are given the same reference numerals.

As described above, when the filter 61a is provided between the fuel cell 1 and the humidifier 3 in the out-air piping 8, substances such as cell debris and rust particles contained in the wet out-air OAw exiting from the fuel cell 1 are captured by the filter 61a so that it is possible to prevent such substances to flow into the humidifier 3 so that clogging can be prevented before such clogging are developed.

Also, when the filter 61b is provided between the supercharger 2 and humidifier 3 in the air piping 7, it can work in conjunction with the filter provided with the supercharger 2 so that substances such as dust particles contained in the dry air Ad can be prevented reliably from entering into the humidifier 3, and clogging can be prevented even more effectively.

However, as operational times are accumulated on the system, the filters 61a, 61b can become clogged so that it is necessary to clean the filters by reverse flow cleansing periodically or according to the readings of the filter inlet pressure obtained by the pressure sensor 35. In such a case, clogging in the filters 61a, 61b can be cleared by conducting a similar process of reverse flow cleansing described in the second embodiment.

Also, in this embodiment, the unreacted matter removal means 62 comprised by adsorbing agent such as activated charcoal and zeolite or platinum catalyst is provided between the filter 61a and the humidifier 3 so that it is possible to prevent such substances contained in the wet out-air OAw from entering the humidifier 3 by eliminating them by adsorbing or combusting the unreacted matters. Therefore, it is possible to prevent difficulties which may arise when such unreacted matters from the fuel cell 1 passing through the hollow thread membrane in the humidifier 3, and the wet out-air OAw containing such matters is used to humidify the fuel cell 1 to cause degradation in the performance of the fuel cell 1.

What is claimed is:

1. A fuel cell humidifying system for supplying a fuel cell with a wet gas produced by providing a dry gas and an exhaust gas discharged from the fuel cell into a humidifier which has a water permeable membrane and for recovering moisture contained in the exhaust gas in the dry gas to produce the wet gas, comprising:

a flow path switching mechanism for switching gas passages leading to the humidifier, wherein the flow path switching mechanism enables the dry gas to flow through an exhaust gas passage in the humidifier.

2. A fuel cell humidifying system for supplying a fuel cell with a wet gas produced by providing a dry gas and an exhaust gas discharged from the fuel cell into a humidifier which has a water permeable membrane and for recovering moisture contained in the exhaust gas in the dry gas to produce the wet gas, comprising:

a flow path switching mechanism for switching gas passages leading to the humidifier, wherein the flow path switching mechanism enable to reverse a direction of flow of exhaust gas in the humidifier by switching the gas passage.

3. A fuel cell humidifying system for supplying a fuel cell with a wet gas produced by providing a dry gas and an exhaust gas discharged from the fuel cell into a humidifier which has a water permeable membrane and for recovering moisture contained in the exhaust gas in the dry gas to produce the wet gas, comprising:

a flow path switching mechanism for switching gas passages leading to the humidifier, wherein the flow path switching mechanism enables the dry gas to flow to an exhaust gas passage in the humidifier when the outside air temperature is equal to 0° C. or lower.

4. A fuel cell humidifying system for supplying a fuel cell with a wet gas produced by providing a dry gas and an exhaust gas discharged from the fuel cell into a humidifier which has a water permeable membrane and for recovering moisture contained in the exhaust gas in the dry gas to produce the wet gas, comprising:

a flow path switching mechanism for switching gas passages leading to the humidifier, wherein the flow path switching mechanism enables the dry gas to flow to an exhaust gas passage in the humidifier when pressure at an inlet of the water permeable membrane exceeds a preset value.

* * * * *